(12) United States Patent
Omori et al.

(10) Patent No.: US 10,922,841 B2
(45) Date of Patent: Feb. 16, 2021

(54) IMAGE PROCESSING DEVICE, IMAGE PROCESSING METHOD, AND IMAGE PROCESSING PROGRAM

(71) Applicant: SHARP KABUSHIKI KAISHA, Sakai (JP)

(72) Inventors: Keisuke Omori, Sakai (JP); Kei Tokui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 92 days.

(21) Appl. No.: 16/305,867

(22) PCT Filed: May 30, 2017

(86) PCT No.: PCT/JP2017/020164
§ 371 (c)(1),
(2) Date: Nov. 29, 2018

(87) PCT Pub. No.: WO2017/209153
PCT Pub. Date: Dec. 7, 2017

(65) Prior Publication Data
US 2019/0347827 A1    Nov. 14, 2019

(30) Foreign Application Priority Data

May 30, 2016 (JP) ................ 2016-107767

(51) Int. Cl.
*G06T 7/73* (2017.01)
*G06T 7/55* (2017.01)
*G01B 11/00* (2006.01)
*G01C 11/06* (2006.01)

(52) U.S. Cl.
CPC .............. *G06T 7/74* (2017.01); *G01B 11/002* (2013.01); *G01C 11/06* (2013.01); *G06T 7/55* (2017.01); *G06T 2207/10028* (2013.01)

(58) Field of Classification Search
None
See application file for complete search history.

(56) References Cited

U.S. PATENT DOCUMENTS

2002/0012460 A1    1/2002  Kochi et al.
2007/0161853 A1*   7/2007  Yagi .................. A61B 1/00177
                                                                600/109

(Continued)

FOREIGN PATENT DOCUMENTS

JP    2002-005659 A    1/2002
JP    2009-175692 A    8/2009

*Primary Examiner* — Delomia L Gilliard
(74) *Attorney, Agent, or Firm* — ScienBiziP, P.C.

(57) ABSTRACT

An image processing device to improve measurement accuracy for a measurement point includes a corresponding point adjusting unit that causes a display unit to display a measurement point peripheral image that is an image of an area in a periphery of the measurement point extracted from a reference image and a corresponding point peripheral image that is an image of an area in a periphery of a corresponding point extracted from a corresponding image, the measurement point peripheral image and the corresponding point peripheral image being displayed side by side, to adjust a position of the corresponding point found by a corresponding point searching unit.

11 Claims, 14 Drawing Sheets

(56) References Cited

U.S. PATENT DOCUMENTS

| | | | |
|---|---|---|---|
| 2009/0167847 A1* | 7/2009 | Doi | A61B 5/1076 |
| | | | 348/65 |
| 2010/0289874 A1* | 11/2010 | Cheng | H04N 13/139 |
| | | | 348/43 |
| 2011/0018987 A1* | 1/2011 | Doi | H04N 7/183 |
| | | | 348/65 |
| 2015/0339817 A1* | 11/2015 | Kuriyama | G06T 7/64 |
| | | | 348/71 |
| 2016/0014328 A1* | 1/2016 | Rokutanda | H04N 5/23212 |
| | | | 348/65 |
| 2018/0103246 A1* | 4/2018 | Yamamoto | A61B 1/00 |

* cited by examiner

IMAGE PROCESSING DEVICE, IMAGE PROCESSING METHOD, AND IMAGE PROCESSING PROGRAM

TECHNICAL FIELD

One aspect of the present invention relates to a technique for measuring three-dimensional coordinates of a measurement point from a reference image and a corresponding image.

BACKGROUND ART

A known conventional method (stereoscopic measurement) of measuring a length, a three-dimensional position (coordinates), or the like of a subject involves using two cameras (stereo cameras). The stereoscopic measurement is performed as follows. Specifically, images of a subject are captured with two cameras arranged at different positions, and the three-dimensional position of the subject is calculated based on a parallax between the subjects in two images captured by the two cameras (difference between coordinates of a measurement point on one of the images and coordinates of a corresponding point on the other one of the images corresponding to the measurement point). Then, the length of the subject, the distance to the subject, and the like are measured. Measurement accuracy of the stereoscopic measurement varies depending on a distance to a subject, a baseline length that is a distance between two cameras, a focal length of a lens, a specification of the cameras such as the number of pixels, parallax calculation accuracy, position designation accuracy of a measurement target on an image, and the like.

An example of a known technique for calculating a parallax includes block matching in which similarity between images is evaluated. Block matching is a method including searching one of images for an area with the highest similarity with respect to an area selected in the other one of the images and calculating a parallax from a difference between the images in the position (coordinates) of an evaluation target area. Unfortunately, the method is affected by noise in the image, the angle of the subject, the pattern of the subject, and the like, and thus does not necessarily result in a correct parallax calculated. In this context, Patent Literature 1 discloses a method of improving the parallax calculation accuracy. Specifically, the technique disclosed in Patent Literature 1 enables a user to adjust the coordinates of a corresponding point by operating a designator while checking a corresponding image in which a corresponding area including the corresponding point is displayed, and moving the corresponding area so that the corresponding area corresponds to a reference area on the reference image.

CITATION LIST

Patent Literature

PTL1: JP 2002-5659 A (published on Jan. 9, 2002)

SUMMARY OF INVENTION

Technical Problem

The method disclosed in Patent Literature 1 has the fall wing problems. In Patent Literature 1, a display unit displays a reference image including a mark indicating the reference area and a corresponding image including a mark indicating the corresponding area. The user searches for the corresponding area corresponding to the reference area by moving the mark indicating the correspond area. With the technique, it is difficult for the user to adjust the corresponding point to a correct position by moving the corresponding area while visually checking the image, if a subject has depth and thus the reference area and the corresponding area include portions with a large difference in parallax. This is because adjustment on the position of the corresponding area on the corresponding image performed so that a part of the corresponding area matches a corresponding part of the reference area results in displacement between other portions. Furthermore, it is difficult for the user to adjust the position of the corresponding point in detail while visually checking the corresponding image, depending on the display size (magnitude) of the corresponding image, that is, in a case where the image is displayed with a reduced size or the like.

An aspect of the present invention is made in view of the above problems, and an object of the aspect is to provide a method with which a user measuring a measuring point can perform accurate adjustment so that a position of a corresponding point on a corresponding image corresponds to the measurement point on a reference image, to improve measurement accuracy for the measurement point.

Solution to Problem

An image processing device according to one aspect of the present invention for solving the problems described above includes a corresponding point searching unit configured to search a corresponding image for a corresponding point corresponding to a measurement point on a reference image obtained by capturing an image of a subject, the corresponding image being obtained by capturing an image of the subject from a point of view different from a point of view for the reference image, a corresponding point adjusting unit that causes a display unit to display a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side, and is configured to adjust a position of the corresponding point based on an instruction input to an input unit, and a calculating unit configured to calculate three-dimensional coordinates of the measurement point on the subject based on a position of the measurement point on the reference image and the position of the corresponding point on the corresponding image.

An image processing method according to one aspect of the present invention includes searching a corresponding image for a corresponding point corresponding to a measurement point on a reference image obtained by capturing an image of a subject, the corresponding image being obtained by capturing an image of the subject from a point of view different from a point of view for the reference image, causing a display unit to display a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side, and adjusting a position of the corresponding point based on an instruction input to an input unit, and calculating three-dimensional coordinates of the measurement point on the subject based on a position of the measurement point on the reference image and the position of the corresponding point on the corresponding image.

Advantageous Effects of Invention

One aspect of the present invention enables a user measuring a measuring point to perform accurate adjustment so that a position of a corresponding point on a corresponding image corresponds to the measurement point on a reference image, so that measurement accuracy can be improved for the measurement point.

DESCRIPTION OF EMBODIMENTS

First Embodiment

Hereinafter, one embodiment of the present invention is described in detail with reference to the drawings.

Image Processing Device

Figure 1:
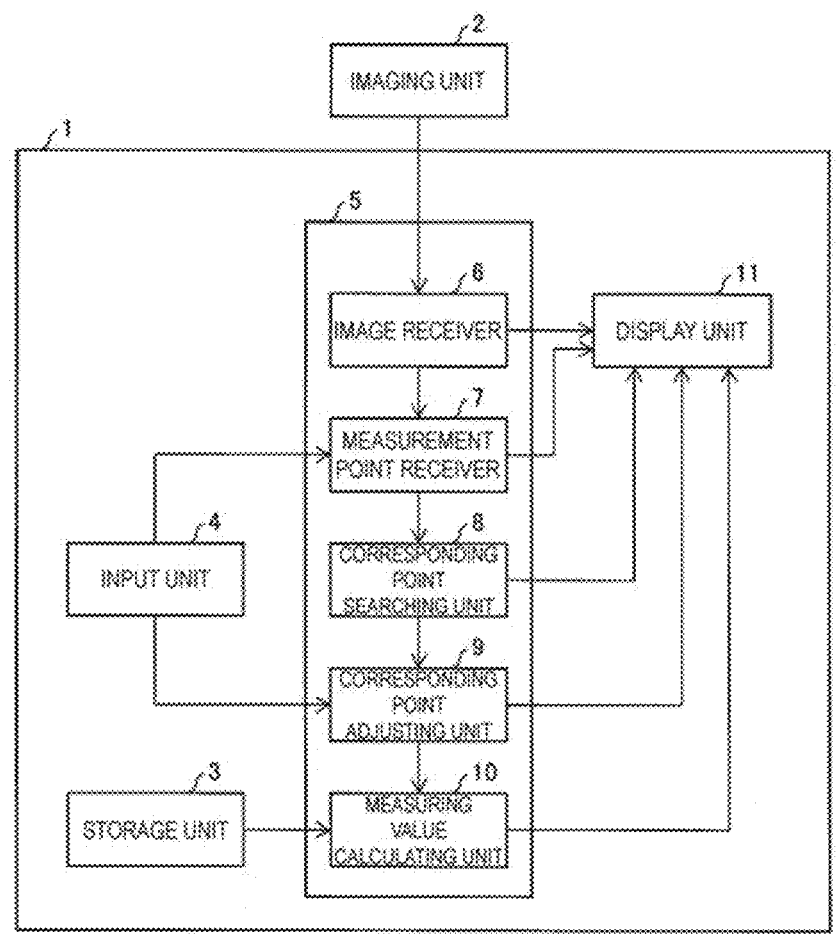
FIG. 1 is a block diagram illustrating an example of a configuration of an image processing device according to a first embodiment.

FIG. 1 is a block diagram illustrating a configuration of an image processing device 1 according to the present embodiment. As illustrated in FIG. 1, the image processing device 1 includes an image capturer 2, a storage 3, an input unit 4, a measurer 5 (calculating unit), and a display unit 11. In the description below, an image referred to by a user for designating a measurement point and an image used by the user for searching for a corresponding point corresponding to the measurement, in stereoscopic measurement, are respectively referred to as a reference image and a corresponding image.

The image capturer 2 includes a first image capturing device 12 and a second image capturing device 13 (illustrated in FIG. 2 described later) and acquires a reference image and a corresponding image corresponding to the reference image, with these image capturing devices capturing an image of a common subject. An example of the image capturer includes a member that includes an, optical system such as a lens module, an image sensor such as a Charge Coupled Device (CCD) and a Complementary Metal Oxide Semiconductor (CMOS), an analog signal processing unit, and an Analog/Digital (A/D) converting unit, and that outputs a signal from the image sensor as an image.

In an example or the present embodiment described below, the corresponding image referred to by the image processing device 1 is a single image captured by either the first image capturing device 12 and the second image capturing device 13 of the image capturer 2. Alternatively, the corresponding image may include a plurality of images captured by a plurality of image capturing devices. A method similar to an image processing method according to the present embodiment may be applied to such a configuration. The image processing device 1 according to the present embodiment includes the image capturer 2. Note that the scope of an aspect of the present invention includes an aspect without the image capturer 2. In such a case, reference and corresponding images captured by a plurality of image capturing devices in advance are used for measuring a measurement point.

The storage 3 stores therein camera parameters such as a baseline length and a focal length required for measuring a measurement point. The storage 3 according to the present embodiment stores therein a camera parameter of the image capturer 2. In a case where the camera parameter changes due to a change in the arrangement of each of the first image capturing device 12 and the second image capturing device 13 of the image capturer 2, the user may update the camera parameter by using the input unit 4 and the storage 3 may receive the new camera parameter from the image capturer 2.

The input unit 4 receives a measurement point, in a subject on the reference image, input from the user (operator). Examples of the input unit 4 include an input device such as a mouse and a keyboard.

The measurer 5 is a member that performs each step in an image processing method according to one aspect of the present invention, and may be a semiconductor circuit such as a central processing unit (CPU) or a large-scale integration (LSI). As illustrated in FIG. 1, the measurer 5 includes an receiver 6, a measurement point receiver 7, a corresponding point searching, unit 8; a corresponding point adjusting unit 9, and a measurement value calculating unit 10. The image receiver 6 receives the reference image and the corresponding image captured by the image capturer 2. The measurement point receiver 7 receives a measurement point (a point on the reference image corresponding to the measurement point) input on the reference image by the user through the input unit 4. The corresponding point searching unit 8 searches for and sets a position of the corresponding point corresponding to the measurement point on the reference image received by the measurement point receiver 7 by using a conventionally known method such as block matching. The corresponding point adjusting unit 9 receives a position of a corresponding point as a result of adjustment by the user through the input unit 4 performed so that the corresponding point, set by the corresponding point searching unit 8, further corresponds to a position of the measurement point on a corresponding point peripheral image. The measurement value calculating unit 10 refers to the camera parameter stored in the storage 3, the position of the measurement point on the reference image received by the measurement point receiver 7, and the position of the corresponding point on the corresponding image received by the corresponding point adjusting unit 9, to calculate the three-dimensional coordinates of the measurement point. The measurement value calculating unit 10 calculates a distance to a subject that is a measurement target, a length of the subject, or the like, from the three-dimensional coordinates of the measurement point thus calculated.

The display unit 11 displays an image (measurement point peripheral image) of an area in the periphery of the measurement point on the reference image and an image (corresponding point peripheral image) of an area in the periphery of the corresponding point on the corresponding image, extracted from the reference image and the corresponding image received by the image receiver 6. The images are displayed side by side. The display unit 11 displays the positions of the measurement points and the corresponding points as a result of processes, performed by the components of the measurer 5, on the measurement point peripheral image and the corresponding point peripheral image, as well as a progress of the processes. The display unit 11 further displays the position of the measurement point calculated by the measurement value calculating unit 10, information about the subject calculated from the position, and information about the image capturer 2 stored in the storage 3.

The display unit 11 may be a conventionally known display device such as a liquid crystal display for example. The input unit 4 and the display unit 11 described above may be integrated. An example of the input unit 4 and the display unit 11 integrated includes a touch panel. The touch panel is a device that senses a touch of the user on a picture or an area displayed on a display screen, and outputs a signal, indicating information about the sensing, to the outside. An example of the touch panel includes a resistive touch panel that senses the voltage at the position touched by the user and a capacitive touch panel that detects the position by sensing a change in static capacitance between a fingertip and a conducting layer. The device with a touch panel can perform an operation corresponding to information about the position of or an operation performed with a finger of the user on the screen.

<Image Processing Method>
(Measurement Error in Stereoscopic Measurement)

Figure 2:
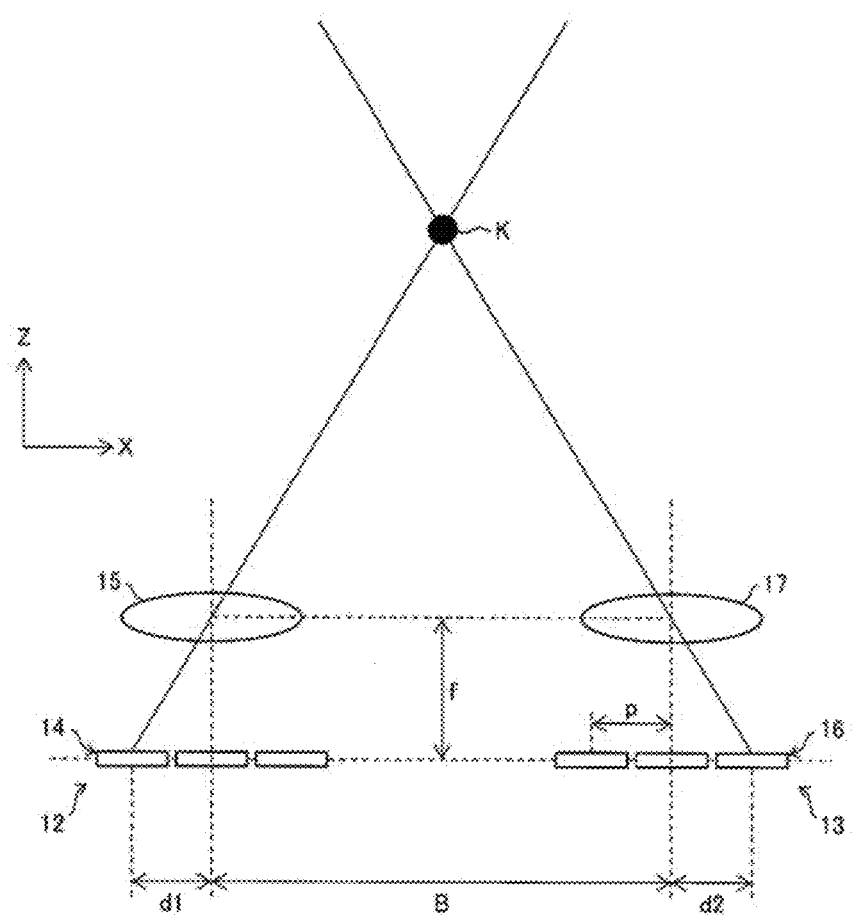
FIG. 2 is a diagram illustrating a mechanism of stereoscopic measurement performed with an image capturer.

Before an image processing method according to the present embodiment is described, first of all, a measurement error in stereoscopic measurement will be described with reference to FIG. 2. FIG. 2 is a diagram illustrating a mechanism of the stereoscopic measurement. In FIG. 2, the first image capturing device 12 is arranged on the left side and the second image capturing device 13 is arranged on the right side. Each of the devices has an optical axis extending along a Z axis direction in FIG. 2. The first image capturing device 12 includes an image sensor 14 and a lens 15. The second image capturing device 13 includes an image sensor 16 and a lens 17. The baseline length and the focal length of each of the first image capturing device 12 and the second image capturing device 13 are respectively denoted with B and f. In FIG. 2, when a coordinate system of the first image capturing device 12 serving as a reference image capturing device for the measurement is used, the three-dimensional coordinates (X, Y, Z) of the measurement point are calculated with the following Formula (1), Formula (2), and Formula (3), by using the parallax d (a difference between the coordinates of the measurement point on an image captured by the first image capturing device 12 and the coordinates of the corresponding point on an image captured by the second image capturing device 13), the focal length f, and the baseline length B.

$$Z=B \times f/d \qquad (1)$$

$$X=x \times Z/f \qquad (2)$$

$$Y=y \times Z/f \qquad (3)$$

Here, x in Formula (2) and y in Formula (3) respectively represent an x coordinate and a y coordinate of a measurement point K on the image captured by the first image capturing device 12. As is apparent from Formula (1), the parallax d needs to be correctly calculated to calculate a Z coordinate in the three-dimensional coordinates of the measurement point with the stereoscopic measurement. Each of Formula (2) and Formula (3) has the right side including Z. Thus, in a case where the parallax d fails to be correctly calculated and thus results in the Z coordinate calculated with Formula (1) being different from the actual coordinate, the X coordinate and the Y coordinate are also shifted. Thus, the calculation accuracy for the parallax d affects the measurement accuracy of the stereoscopic measurement. In view of the above, a method for improving the measurement accuracy according to the present invention is described below. The method is achieved with the parallax correctly calculated with the corresponding point adjusted by the user to be at the position corresponding to the measurement point K even in a case where there is an error in the parallax with the corresponding point found by the corresponding point searching unit 8 not corresponding to the measurement point K.

(Image Processing Method According to Aspect 1)

Figure 3:
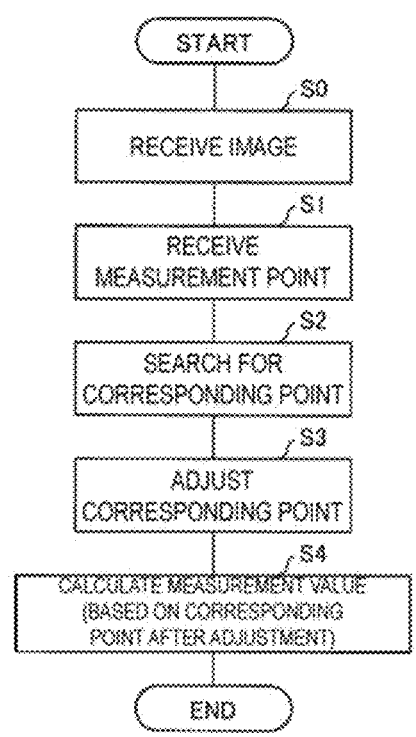
FIG. 3 is a flowchart illustrating an image processing method according to Aspect 1 of a first embodiment of the present invention.

FIG. 3 is a flowchart illustrating an image processing method according to Aspect 1 of the present embodiment performed by the image processing device 1. The display unit 11 displays the reference image and the corresponding image received by the image receiver as well as the measurement point peripheral image and the corresponding point peripheral image through steps S0 to S4 described later. The user performs operations, required for measuring a measurement point as described later, through the input unit 4 by referring to the images displayed by the display unit 11. The measurement point peripheral image and the corresponding point peripheral image are described more in detail in a later section (corresponding point adjustment by user).

The image receiver 6 receives the reference image and the corresponding image respectively acquired by the first image capturing device 12 and the second image capturing device 13 (step S0). Any one of the two images captured by the first image capturing device 12 and the second image capturing device 13 may be selected as the reference image by the user or by the image receiver 6 automatically. The display unit 11 displays the reference image and the corresponding image received by the image receiver 6 in response to step S0. Further in response to step S0, the display unit 1 extracts an image of an area in the periphery of the measurement point (measurement point peripheral image) in the reference image and an image of an area in the periphery of the corresponding point (corresponding point peripheral image) in the corresponding image, respectively from the reference image and the corresponding image received by the image receiver 6, and displays the images side by side.

Next, the measurement point receiver 7 receives the measurement point input by the user on the reference image through the input unit 4 (step S1). For example, the user can select a point at a desired position, on the reference image displayed by the display unit 11, as the coordinates of the measurement point by operating a mouse or a four-way controller to move a cursor on the reference image or to perform the other like operation. The user may further input a numerical value indicating the coordinates of the measurement point through the input unit 4 to designate the position of the measurement point on the reference image. The configuration where the user inputs the numerical value indicating the coordinates of the measurement point, enables the user to check the position of the measurement point on the reference image, with a pointer or the like indicating the position of the coordinates input by the user displayed on the reference image displayed by the display unit 11 in an overlapping manner.

Next, the corresponding point searching unit 8 searches for and sets the corresponding point corresponding to the measurement point received by the measurement point receiver 7, on the corresponding image (step S2). For example, the corresponding point searching unit 8 can use a conventionally known method such as block matching to search for the corresponding point.

Next, the user adjusts the corresponding point set by the corresponding point searching unit 8 through the input unit 4 while referring to the measurement point peripheral image and the corresponding point peripheral image described above displayed on the display unit 11, so that the corresponding point further corresponds to a position of the measurement point on the corresponding point peripheral image (corresponding point adjustment step). Then, the corresponding point adjusting unit 9 receives the position of the corresponding point thus adjusted by the user (step S3). How the user adjusts the position of the corresponding point through the input unit 4 while referring to the measurement point peripheral image and the corresponding point peripheral image displayed on the display unit 11 in this step is described more in detail in the later described section (corresponding point adjustment by user).

Next, the measurement value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image received by the corresponding point adjusting unit 9 (step S4, calculation step). The measurement value calculating unit 10 may calculate the distance to the subject that is the measurement target, the length of the subject, or the like, from the three-dimensional coordinates of the measurement point thus calculated. The three-dimensional coordinates of the measurement point calculated by the measurement value calculating unit 10 are not particularly limited and may be coordinates obtained with the first image capturing device 12 or the second image capturing device 13 that has captured the reference image or the corresponding image, or may be any coordinates set in advance. In response to step S4, the display unit 11 may display the three-dimensional coordinates of the measurement point calculated by the measurement value calculating unit 10 and each measurement value related to the subject calculated from the coordinates.

(Image Processing Method According to Aspect 2)

Figure 4:
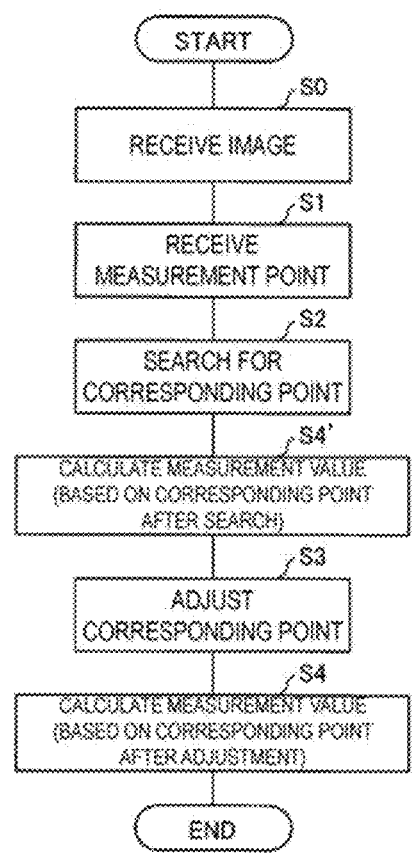
FIG. 4 is a flowchart illustrating an image processing method according to Aspect 2 of a first embodiment of the present invention.

FIG. 4 is a flowchart illustrating, an image processing method according to Aspect 2 of the present embodiment performed by the image processing device 1. The image processing method according to the present aspect is the same as the image processing method according to Aspect 1, except that the order of steps S0 to S4 performed by the image processing device 1 is changed and that step S4' with a process that is substantially similar to that of step S4 is performed. Thus, detail description of steps denoted with the same reference number as the counterparts in Aspect 1 will be omitted.

As illustrated in FIG. 4, the image receiver 6 receives the reference image and the corresponding image respectively acquired by the first image capturing device 12 and the second image capturing device 13 (step S0). Next, the measurement point receiver 7 receives the measurement point input by the user on the reference image through the input unit 4 (step S1). Next, the corresponding point searching unit 8 searches for and sets the corresponding point corresponding to the measurement point received by the measurement point receiver 7, on the corresponding image (step S2, corresponding point search step).

Next, the measurement value calculating unit 10 calculates the three-dimensional coordinates of the measurement point by referring, to and based on the camera parameter stored in the storage 3, the position of the measurement point on the reference image received by the measurement point receiver 7, and, the position of the corresponding point on the corresponding image set by the corresponding point searching unit 8 (step S4', calculation step).

Next, the user adjusts the corresponding point set by the corresponding point searching unit 8 through the input unit 4 while referring to the measurement point peripheral image and the corresponding point peripheral image described above displayed on the display unit, so that the corresponding point further corresponds to a position of the measurement point on the corresponding point peripheral image (corresponding point adjustment step). Then, the corresponding point adjusting unit 9 receives the position of the corresponding point thus adjusted by the user (step S3).

Next, the measurement Value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image received by the corresponding point adjusting unit 9 (step S4).

The display unit 11 displays the three-dimensional coordinates of the measurement point calculated by the measurement value calculating unit 10 in step S4' and the three-dimensional coordinates of the measurement point calculated by the measurement value calculating unit 10 in step S4.

With the image processing method according to Aspect 2 described above, the user can compare the three-dimensional coordinates of the measurement point calculated by the measurement value calculating unit 10 in step S4' with the three-dimensional coordinates of the measurement point calculated by the measurement value calculating unit 10 in step S4. Thus, the user can check whether the corresponding point searching unit 8 has accurately set the corresponding point corresponding to the measurement point.

(Image Processing Method According to Aspect 3)

Figure 5:
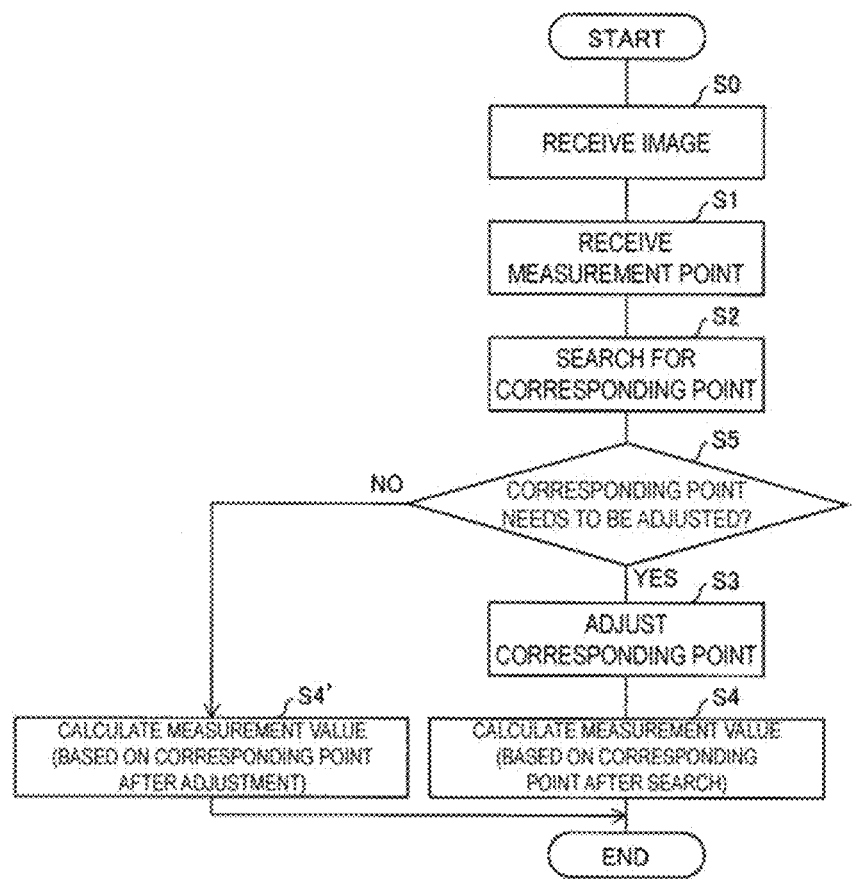
FIG. 5 is a flowchart illustrating an image processing method according to Aspect 3 of a first embodiment of the present invention.

FIG. 5 is a flowchart illustrating an image processing method according to Aspect 3 of the present embodiment performed by the image processing device 1. The image processing method according to the present aspect is the same as the image processing method according to Aspect 1 except that step S4' is added and step S5 is further added. Thus, detail description of steps denoted with the same reference number as the counterparts in Aspect 1 will be omitted.

As illustrated in FIG. 5, the image receiver 6 receives the reference image and the corresponding image respectively acquired by the first image capturing device 12 and the second image capturing device 13 (step S0). Next, the measurement point receiver 7 receives the measurement point input by the user on the reference image through the input unit 4 (step S1). Next, the corresponding point searching unit 8 searches for and sets the corresponding point corresponding to the measurement point received by the measurement point receiver 7, on the corresponding image (step S2, corresponding point search step).

Next, the corresponding point searching unit 8 determines whether the position of the corresponding point on the corresponding image thus set needs to be adjusted (step S5). In step S5, the corresponding point searching unit 8 may determine whether the position of the corresponding point needs to be adjusted by automatically determining whether the set position of the corresponding point corresponds to the measurement point. The corresponding point searching unit 8 may also determine whether the position of the corresponding point needs to be adjusted, with the user determining whether the position of the corresponding point set by the corresponding point searching unit 8 corresponds to the measurement point while referring to the position of the corresponding point set by the corresponding point searching unit 8 displayed by the display unit, and inputting a result of the determination through the input unit 4.

When the corresponding point searching unit 8 determines that the corresponding point adjustment is required in step S5, the user adjusts the corresponding point set by the corresponding point searching unit 8 through the input unit 4 while referring to the measurement point peripheral image and the corresponding point peripheral image displayed on the display unit 11 so that the corresponding point further corresponds to the position of the measurement point on the corresponding point peripheral image (corresponding point adjustment step). Then, the corresponding point adjusting unit 9 receives the position of the corresponding point thus adjusted by the user (step S3). Next, the measurement value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image received by the corresponding point adjusting unit 9 (step S4, calculation step).

When the corresponding point searching unit 8 determines that the corresponding point does not need to be adjusted in step S5, the measurement value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image set by the corresponding point searching unit 8 (step S4', calculation step).

With the image processing method according to Aspect 3 described above, the corresponding point searching unit 8 determines whether the corresponding point adjustment by the user is required so that the user does not need to unnecessarily perform the corresponding point adjustment. Thus, the image processing method according to the present embodiment can be efficiently performed.

(Image Processing Method According to Aspect 4)

Figure 6:
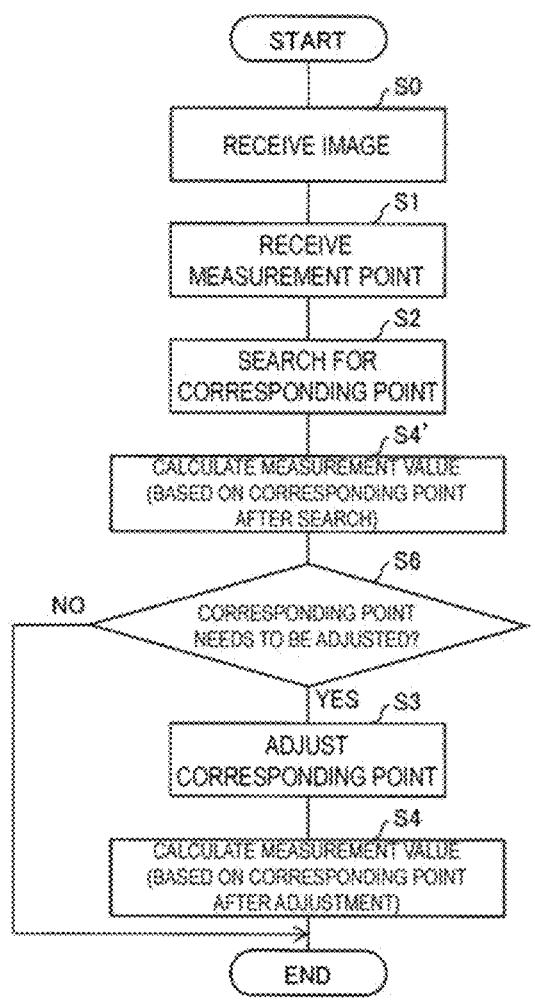
FIG. 6 is a flowchart illustrating an image processing method according to Aspect 4 of a first embodiment of the present invention.

FIG. 6 is a flowchart illustrating an image processing method according to Aspect 2 of the present embodiment performed by the image processing device 1. The image processing method according to the present aspect is the same as the image processing method according to Aspect 1 except that step S4' is added and step S6 is further added. Thus, detail description or steps denoted with the same reference number as the counterparts in Aspect 1 will be omitted.

As illustrated in FIG. 6, the image receiver 6 receives the reference image and the corresponding image respectively acquired by the first image capturing device 12 and the second image capturing device 13 (step S0), Next, the measurement point receiver 7 receives the measurement point input by the user on the reference image through the input unit 4 (step S1). Next, the corresponding point searching unit 8 searches for and sets the corresponding point corresponding to the measurement point received by the measurement point receiver 7, on the corresponding image (step S2, corresponding point search step). Next, the measurement value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image set by the corresponding point searching unit 8 (step S4', calculation step).

Next, the user determines whether the position of the corresponding point needs to be adjusted by referring to the three-dimensional coordinates of the measurement point calculated by the measurement value calculating unit 10 (step S6). Then, the user inputs the result of this determination through the input unit 4 so that the corresponding point searching unit 8 can determine whether the position of the corresponding point needs to be adjusted. If needed, the user may determine whether the position of the corresponding point needs to be adjusted by also referring to the position of the corresponding point set by the corresponding point searching unit 8. In step S6, whether the position of the corresponding point needs to be adjusted may be automatically determined with reference to the three-dimensional coordinates of the measurement point calculated by the measurement value calculating unit 10. For example, when the automatic determination is employed, the position of the corresponding point can be determined to be required if the three-dimensional coordinates of the measurement point calculated by the measurement value calculating unit 10 indicate a position outside a measurement target range of the stereo camera used for the measurement.

When the measurement value calculating unit 10 determines that the corresponding point adjustment is required in step S6, the user adjusts the corresponding point set by the corresponding point searching unit 8 by referring to the measurement point peripheral image and the corresponding point peripheral image displayed on the display unit 11 so that the corresponding point further corresponds to the position of the measurement point on the corresponding point peripheral image (corresponding point adjustment step). Then, the corresponding point adjusting unit 9 receives the position of the corresponding point thus adjusted by the user (step S3). Next, the measurement value calculating unit 10 calculates the three-dimensional coordinates of the measurement point by referring to and based on the camera parameter stored in the storage 3, the position of the measurement point on the reference image received by the measurement point receiver 7, and the position of the corresponding point on the corresponding image received by the corresponding point adjusting unit 9 (step S4, calculation step).

In a case where the measurement value calculating unit 10 determines that the corresponding point adjustment is not required in step S6, the measurement value calculating unit 10 determines that the three-dimensional coordinates of the measurement point calculated is the actual three-dimensional coordinates of the measurement point in step S4', and a series of processes for measuring a measurement value is terminated.

With the image processing method according to Aspect 4 described above, the measurement value calculating unit 10 determines whether the corresponding point adjustment by the user is required so that the user needs not to unnecessarily perform the corresponding point adjustment. Thus, the image processing method according to the present embodiment can be efficiently performed.

(Corresponding Point Adjustment by User)

As described above, in step S3, the user adjusts the position of the corresponding point on the corresponding image while referring to the measurement point peripheral image and the corresponding point peripheral image displayed by the display unit 11. In this section, this adjustment of the corresponding point by the user as well as the measurement point peripheral image and the corresponding point peripheral image used for the adjustment will be described below in detail. FIG. 7 to FIG. 14 referred to in the description below illustrate images displayed by the display unit 11. In the figures, an upper and lower direction is referred to as a vertical direction and a left and right direction is referred to as a horizontal direction.

Figure 7A:
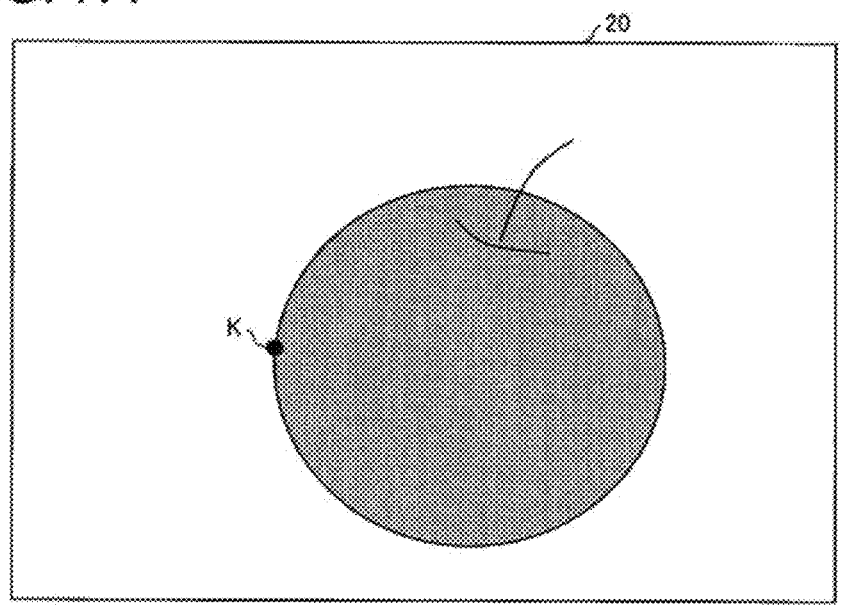
FIG. 7A is a diagram illustrating a reference image displayed by a display unit.
Figure 7B:
FIG. 7B is a diagram illustrating a measurement point peripheral image and a corresponding point peripheral image displayed by a display unit.

FIG. 7A illustrates a reference image 20, with the measurement point K illustrated in the reference image 20 representing the position of the measurement point received by the measurement point receiver 7 from the user. FIG. 7B illustrates an image 21 (measurement point peripheral image 21) of an area in the periphery of the measurement point K, selected within the reference image 20 by the user, and an image 22 (corresponding point peripheral image 22) of an area in the periphery of a corresponding point found in a corresponding image (not illustrated) by the corresponding point searching unit 8.

As illustrated in FIG. 7B, the display unit 11 displays the measurement point peripheral image 21 and the corresponding point peripheral image 22 side by side, so that the user can easily visually check whether the corresponding point searching unit 8 has successfully set the corresponding point at the measurement point K. With this configuration, the user can adjust the corresponding point through the input unit 4, so that the corresponding point on the corresponding image corresponds to the measurement point K on the reference image 20.

The display unit 11 may display the measurement point peripheral image and the corresponding point peripheral image with the area in the periphery of the measurement point and the area in the periphery of the corresponding point in the images enlarged. With this configuration, the user can adjust the position of the corresponding point through the input unit 4 while checking positions of the measurement point K and the corresponding point in detail.

In a case where a result of the search for the corresponding point by the corresponding point searching unit 8 is determined to be inappropriate, the user adjusts the corresponding point on the image of the periphery of the corresponding point. In a case where the result of the search for the corresponding point by the corresponding point searching unit 8 is determined to be appropriate, the user does not adjust the corresponding point. The measurement value calculating unit 10 calculates the three-dimensional coordinates of the measurement point from the camera parameter of the image captures 2, the position of the measurement point K on the reference image 20, and the position of the corresponding point set by the corresponding point searching unit 8. For example, the display unit 11 may display options such as "ADJUST CORRESPONDING POINT" and "PERFORM MEASUREMENT WITHOUT ADJUSTING CORRESPONDING POINT" so that the measurer 5 can receive a result of the user determination whether the result of the search for the corresponding point by the corresponding point searching unit 8 is appropriate. The user can select a step to be performed after the search for the corresponding point by the corresponding point searching unit 8 by selecting either "ADJUST CORRESPONDING POINT" or "PERFORM MEASUREMENT WITHOUT ADJUSTING CORRESPONDING POINT" by operating a mouse or the like for the input unit 4. If the display unit 11 is a touch panel also having the function of the input unit 4, the user can select the step to be performed after the search for the corresponding point by the corresponding point searching unit 8 by performing a touch operation. In a case where the corresponding point searching unit 8 searching for the corresponding point fails to find the corresponding point corresponding to the measurement point K, the corresponding point adjusting unit 9 may receive the position of the corresponding point as a result of the adjustment of the position of the corresponding point performed by the user through the input unit 4 without selecting whether the corresponding point needs to be adjusted. With this configuration, the user does not need to determine whether the corresponding point needs to be adjusted, and thus the image processing method can be efficiently performed by the image processing device 1. Alternatively, whether the corresponding point corresponds to the measurement point K may be determined in the following manner. Specifically, the display unit 11 may display the measurement result obtained by the measurement value calculating unit 10, and the user may determine that the corresponding point set by the corresponding point searching unit 8 is inappropriate when the displayed measurement result largely differs from an expected measurement result. As in the processes in the flowchart illustrated in FIG. 4 or FIG. 6, the measurement value calculating unit 10 may calculate the measurement value before the corresponding point is adjusted, the display unit 11 may display the measurement value, the area in the periphery of the measurement point K, and the area in the periphery of the corresponding point, and the user may adjust the corresponding point while referring to these. Alternatively, as in the processes in the flowchart illustrated in FIG. 3 or FIG. 4, the user may directly proceed to the adjustment of the corresponding point without determining whether the corresponding point needs to be adjusted.

Figure 8:
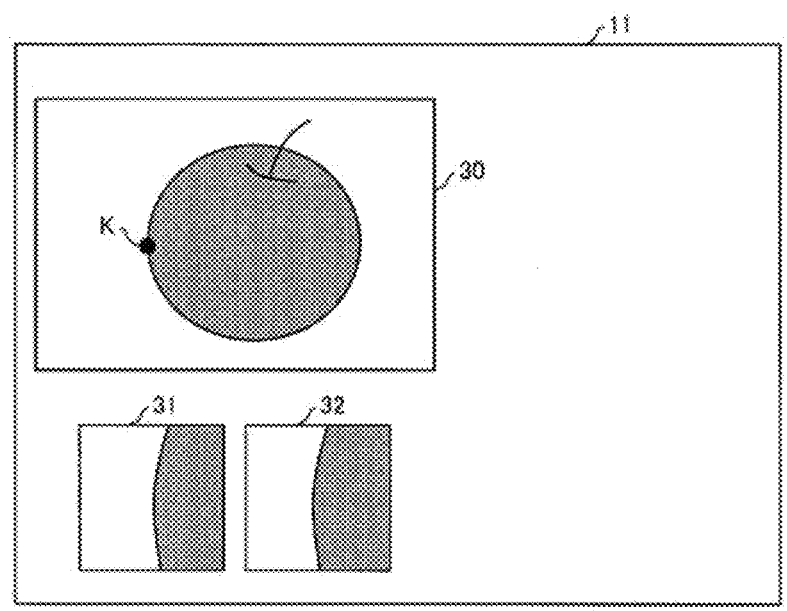
FIG. 8 is a diagram illustrating a display unit displaying a reference image, a measurement point peripheral image, and a corresponding point peripheral image.

Next, the process by which the corresponding point is adjusted by the corresponding point adjusting unit 9 is described. FIG. 8 illustrates the display unit 11 displaying a reference image 30. The display unit 11 illustrated in FIG. 8 is displaying an image 31 (measurement point peripheral image 31) of an area in the periphery of the measurement point K and an image 32 (corresponding point peripheral image 32) of an area in the periphery of the corresponding point found in the corresponding image (not illustrated) by the corresponding point searching unit 8. When the display unit 11 displays the measurement point peripheral image 31 and the corresponding point peripheral image 32 at adjacent positions as illustrated in FIG. 8, the user can visually recognize the images at once, and thus can more easily determine whether the position of the corresponding point corresponds to the position of the measurement point K during the adjustment of the corresponding point.

Figure 9A:
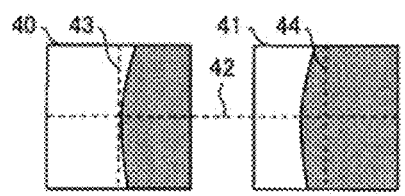
FIG. 9A and FIG. 9B are diagrams illustrating a measurement point peripheral image and a corresponding point peripheral image displayed by a display unit.

FIG. 9A illustrates an image 40 (measurement point peripheral image 40) of an area in the periphery of the measurement point K and an image 41 (corresponding point peripheral image 41) of an area in the periphery of the corresponding point according to an aspect of the present embodiment. The measurement point peripheral image 40 and the corresponding point peripheral image 41 are displayed to be arranged side by side along their epipolar lines. The measurement point peripheral image 40 and the corresponding point peripheral image 41 illustrated in FIG. 9A depict a state before the adjustment by the user, and thus the measurement point K does not correspond to the corresponding point. In each of the measurement point peripheral image 40 and the corresponding point peripheral image 41, guides as indicated by dotted lines are displayed in an overlapping manner. Specifically, the display unit 11 displays a guide (horizontal guide 42) passing through the measurement point and the corresponding point and two guides (vertical guides 43 and 44) that are orthogonal to the horizontal guide 42, in the measurement point peripheral image 40 and the corresponding point peripheral image 41 in an overlapping manner. The vertical guides 43 and 44 respectively pass through the measurement point K and the corresponding point in the images. With this configuration, the user can more easily notice the displacement between the measurement point K and the corresponding point, and thus can more easily adjust the position of the corresponding point so that the position of the corresponding point corresponds to the position of the measurement point K. In this example, the horizontal guide 42 overlaps with the epipolar line of the images in a collinear manner. A point on an image captured by one camera and a position corresponding to the point on an image captured by the other camera are positioned on a straight line which is referred to as the epipolar line.

Figure 9B:
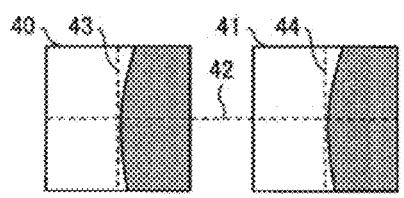

FIG. 9B illustrates the measurement point peripheral image 40 and the corresponding point peripheral image 41 as a result of the adjustment of the corresponding point on the measurement point peripheral image 40 and the corresponding point peripheral image 41 in FIG. 9A by the user. It is apparent that the corresponding point corresponds to the measurement point K, from comparison between the measurement point peripheral image 40 and the corresponding point peripheral image 41 in areas in the periphery of intersections between the horizontal guide and the two vertical guides. In this manner, the user can adjust the position of the corresponding point while checking that the image 41 is being adjusted so that the position of the corresponding point corresponds to the position of the measurement point K, by adjusting the position of the corresponding point while referring to the guides.

Figure 10A:
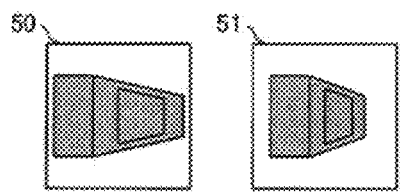
FIG. 10A and FIG. 10B are diagrams illustrating a measurement point peripheral image and a corresponding point peripheral image displayed by a display unit.

FIG. 10A illustrates art image 50 (measurement point peripheral image 50) of an area in the periphery of the measurement point K and an image 51 (corresponding point peripheral image 51) of an area in the periphery of the corresponding point according to an aspect of the present embodiment. Each of the image 50 and the image 51 includes a subject. This subject has a depth, and thus involves points different from each other in parallax. Specifically, points in areas in the periphery of the measurement point K and in the periphery of the corresponding point are different from each other in parallax. In this case, adjustment for the corresponding image to equalize the parallax for the points in the entire areas displayed is not a feasible option. Thus, the user may adjust the position of the corresponding point so that a part of the area in the periphery of the measurement point K corresponds to a part of the area in the periphery of the corresponding point. However, this only results in other parts of the images not corresponding to each other (displacement). All things considered, it is difficult for the user to perform the adjustment so that the corresponding point corresponds to the measurement point K.

Figure 10B:
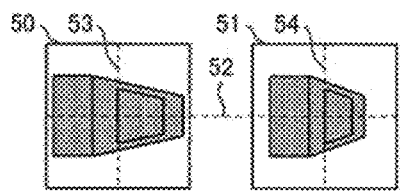

FIG. 10B illustrates another mode of the measurement point peripheral image 50 and the corresponding point peripheral image 51 illustrated in FIG. 10O. The display unit 11 displays a horizontal guide 52 and vertical guides 53 and 54 in the measurement point peripheral image 50 and the corresponding point peripheral image 51 in an overlapping manner, as in the measurement point peripheral image 40 and the corresponding point peripheral image 41 in FIG. 9A and FIG. 9B. The user can easily perform the adjustment so that the position of the corresponding point corresponds the position of the measurement point K by referring to these guides, even when the display areas include areas largely different from each other in parallax. The corresponding point may be adjusted with the user operating the mouse or using the four-way controller to input an operation for moving the area in the periphery of the corresponding point displayed by the display unit 11. The corresponding point is on the epipolar line of the corresponding image, and thus the user may perform the adjustment of the corresponding point with the adjustable direction limited to a direction along the epipolar line direction by the corresponding point adjusting unit 9. Thus, the risk of adjusting the corresponding point to a wrong position can be reduced. It is difficult for the user to accurately adjust the position of the corresponding point along the epipolar line direction through a mouse or touch operation. Thus, the corresponding point can be prevented from being inappropriately adjusted to be outside the epipolar line with the corresponding point adjusting unit 9 limiting the user's adjustable direction. After the adjustment of the corresponding point by the user is completed, the display unit 11 may display a message "TERMINATE ADJUSTMENT" for example. Thus, the user can determine whether to continue the corresponding point adjustment by selecting whether to terminate the adjustment of the corresponding point through a mouse operation or the like.

Next, a more preferable display mode of the display unit 11 is described in detail.

Figure 11:
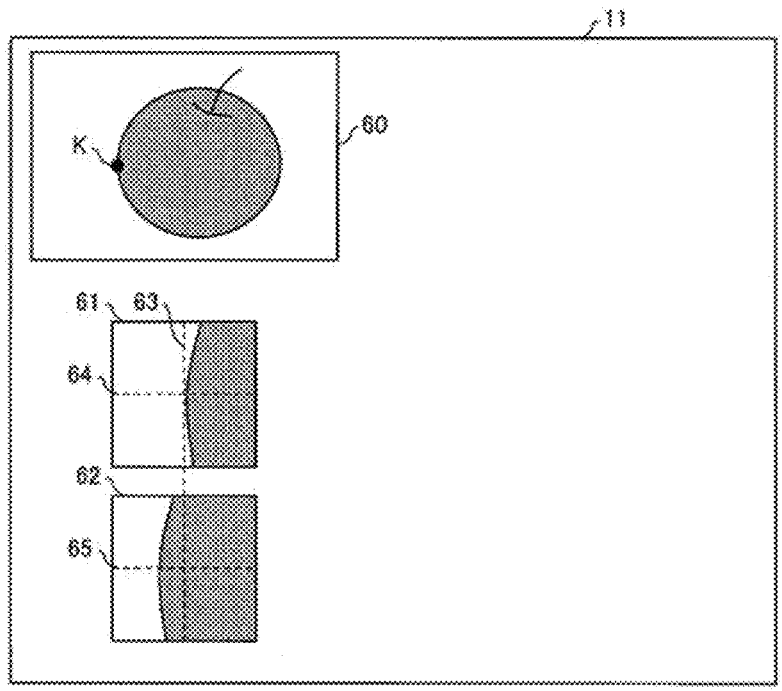
FIG. 11 is a diagram illustrating a display unit displaying a reference image, a measurement point peripheral image, and a corresponding point peripheral image.

FIG. 11 illustrates the display unit 11 according to one aspect of the present embodiment. This display unit 11 is displaying a reference image 60 captured by one of two image capturing devices (not illustrated) arranged with the optical axes on the same horizontal plane. The display unit 11 also displays the measurement point K in the reference image 60 in an overlapping manner. The display unit 11 is further displaying an image 61 (measurement point peripheral image 61) or an area, in the periphery of the measurement point K in the reference image 60 and an image 62 (corresponding point peripheral image 62) of an area in the periphery of the corresponding point on a corresponding image (not illustrated). These images are displayed side by side along a direction (the vertical direction in this example) orthogonal to the epipolar line of the images. Specifically, the display unit 11 displays a guide (vertical guide 63) passing through the measurement point K and the corresponding point and two guides (horizontal guides 64 and 65) that are orthogonal to the vertical guide 63 in the measurement point peripheral image 61 and the corresponding point peripheral image 62 in an overlapping manner. The horizontal guides 64 and 65 respectively pass through the measurement point K and the corresponding point in the images. The epipolar line of the images captured by the two image capturing devices arranged with the optical axes on the same horizontal plane extends along the horizontal direction of the images. Thus, the corresponding point searching unit 8 only needs to search the corresponding image along the horizontal direction, that is, the epipolar line direction, and the displacement of the corresponding point as a result of the search also occurs along the horizontal direction of the corresponding image. Thus, the user needs to adjust the corresponding point only in the horizontal direction of the corresponding image. As illustrated in FIG. 11, the display unit 11 displays the measurement point peripheral image 61 and the corresponding point peripheral image 62 side by side along the direction orthogonal to the epipolar line of the images. Thus, the user can more easily recognize the displacement between the epipolar line directions of the images, compared with the case where the measurement point peripheral image and the corresponding point peripheral image displayed to be arranged with their epipolar lines arranged in a collinear manner as illustrated in FIG. 9A.

Figure 12:
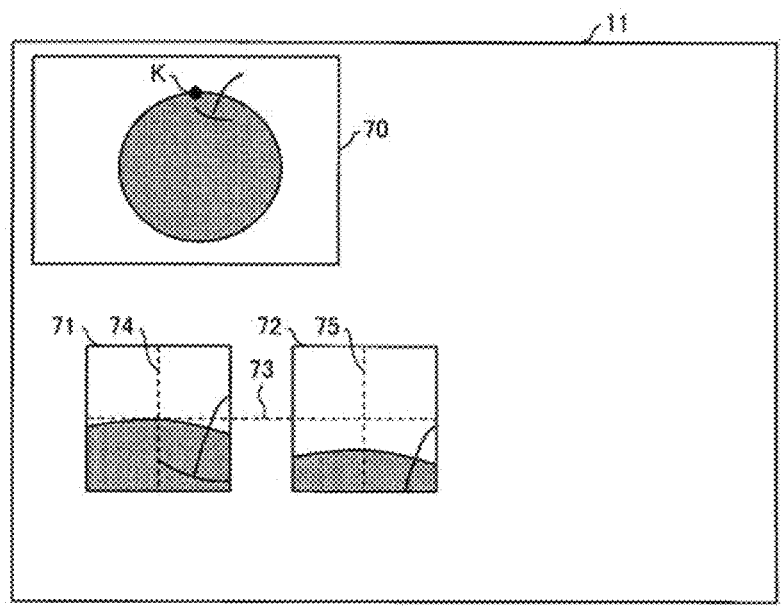
FIG. 12 is a diagram illustrating a display unit displaying a reference image, a measurement point peripheral image, and a corresponding point peripheral image.

FIG. 12 illustrates the display unit 11 according to one aspect of the present embodiment. This display unit 11 is displaying a reference image 70 captured by one of two image capturing devices arranged with the optical axes on the same vertical plane. The display unit 11 is displaying the measurement point K in the reference image 70 in an overlapping manner. The display unit 11 is further displaying an image 71 (measurement point peripheral image 71) of an area in the periphery of the measurement point K and an image 72 (corresponding point peripheral image 72) of an area in the periphery of the corresponding point on a corresponding image. These images are displayed side by side along a direction (the horizontal direction in this example) orthogonal to the epipolar line of the images. The display unit 11 displays a guide (horizontal guide 73) passing through the measurement point K and the corresponding point and two guides (vertical guides 74 and 75) that are orthogonal to the horizontal guide 73 in an overlapping manner in the measurement point peripheral image 71 and the corresponding point peripheral image 72 displayed side by side. The vertical guides 74 and 475 respectively pass through the measurement point K and the corresponding point in the images. In a case where the reference image and the corresponding image are captured by two image capturing devices arranged side by side with the optical axes on the same vertical plane, the epipolar line of the images extends along the vertical direction of the images. The display unit 11 displays the measurement point peripheral image 71 and the corresponding point peripheral image 72 side by side along the direction orthogonal to the epipolar line of the images. The user can adjust the corresponding point while recognizing the displacement in the images along the epipolar line direction, by referring to the measurement point peripheral image 71 and the corresponding point peripheral image 72 displayed side by side.

Figure 13:
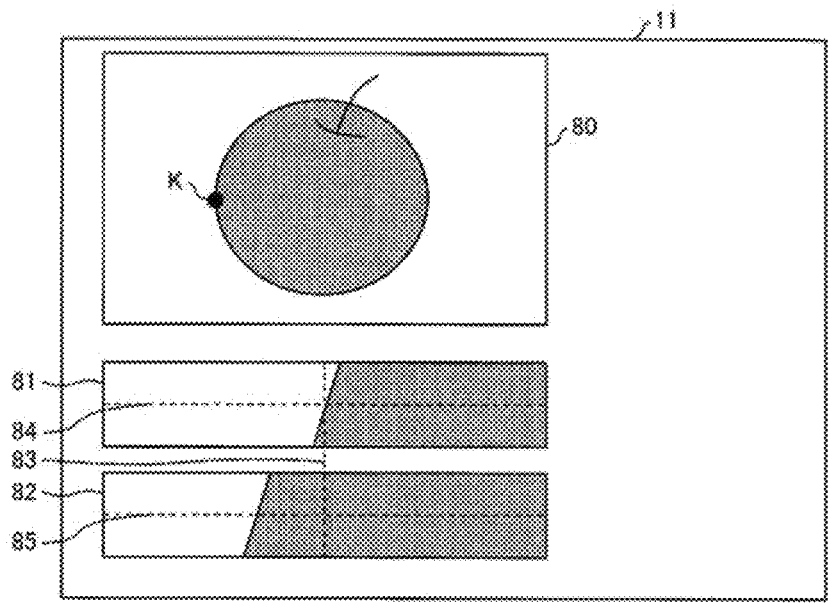
FIG. 13 is a diagram illustrating a display unit displaying a reference image, a measurement point peripheral image, and a corresponding point peripheral image.

FIG. 13 illustrates the display unit 11 according to one aspect of the present embodiment. This display unit 11 is displaying a reference image 80 captured by one of two image capturing devices (not illustrated) arranged with the optical axes on the same horizontal plane as in FIG. 11. The display unit 11 is displaying the measurement point K in the reference image 80 in an overlapping manner. The display unit 11 is further displaying an image 81 (measurement point peripheral image 81) of an area in the periphery of the measurement point K in the reference image 80 and an image 82 (corresponding point peripheral image 82) of an area in the periphery of the corresponding point on a corresponding image (not illustrated). These images are displayed side by side along a direction (the vertical direction in this example) orthogonal to the epipolar lines of the images. The display unit 11 displays a guide (vertical guide 83) passing through the measurement point K and the corresponding, point and two guides (horizontal guides 84 and 85) that are orthogonal to the vertical guide 83 in an overlapping manner in the image 81 and the image 82 displayed side by side. The horizontal guides 84 and 85 respectively pass through the measurement point K and the corresponding point in the images. The images 81 and 82 in FIG. 13 and the images 61 and 62 in FIG. 11 are different from each other in the aspect ratio of the display areas. Specifically, the images 81 and 82 in FIG. 13 have elongated shape extending in the horizontal direction. The images 81 and 82 have longitudinal sides extending along the epipolar lines of the images. The corresponding point is on the epipolar line, and thus the user can more easily recognize the displacement between the epipolar line directions by reducing the widths of the measurement point peripheral image 81 and the corresponding point peripheral image 82 in the direction orthogonal to the epipolar lines extending along the horizontal direction of the corresponding image. The display unit 11 may display the measurement point peripheral image 81 and the corresponding point peripheral image 82 with elongates shapes (rectangular shapes for example) extending along the longitudinal direction of the display unit 11 as illustrated in FIG. 13, so that the space of the display unit 11 can be more effectively used compared with the display mode illustrated in FIG. 11.

Figure 14:
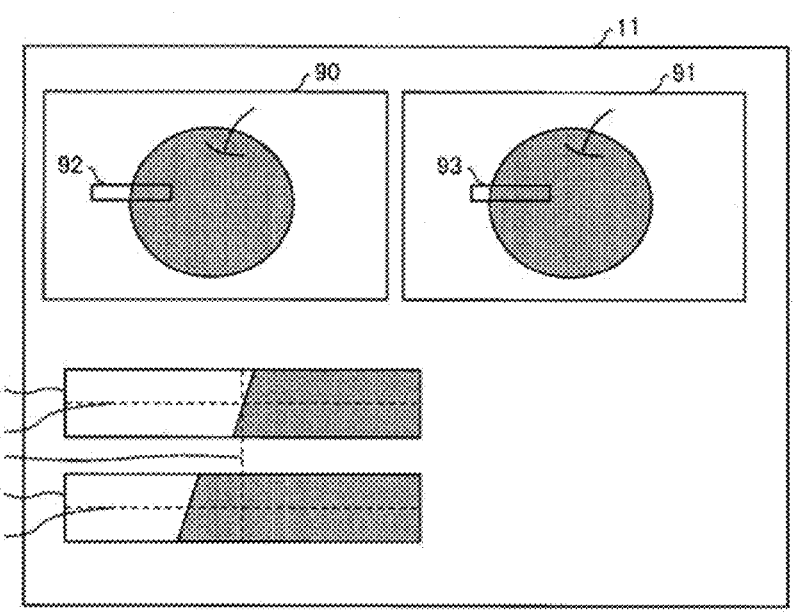
FIG. 14 is a diagram illustrating a display unit displaying a reference image, a measurement point peripheral, image, and a corresponding point peripheral image.

FIG. 14 illustrates the display unit 11 according to one aspect of the present embodiment. The display unit 11 is displaying a reference image 90, a corresponding image 91, an image 94 (measurement point peripheral image 94) of an area in the periphery of the measurement point K, and an image 95 (corresponding point peripheral image 95) of an area in the periphery of the corresponding point. Specifically, the display unit 11 displays a guide (vertical guide 96) passing through the measurement point K and the corresponding point and two guides (horizontal guides 97 and 98) that are orthogonal to the vertical guide 96 in an overlapping manner in the measurement point peripheral image 94 and the corresponding point peripheral image 95 displayed side by side. The horizontal guides 97 and 98 respectively pass through the measurement point K and the corresponding point in the images. The display unit 11 is displaying a marker 92 in the reference image 90 in an overlapping manner. The marker 92 indicates the area in the periphery of the measurement point K displayed in the image 94. The display unit 11 is displaying a marker 93 in the corresponding image 91 in an overlapping manner. The marker 93 indicates the area in the periphery of the corresponding point displayed in the image 95. With the positions where the reference image 90 and the corresponding image 91 are clipped to display the measurement point peripheral image 94 and the corresponding point peripheral image 95 thus displayed on the reference image 90 and on the corresponding image 91, the user can be prevented from adjusting the corresponding point to be at the position not corresponding to the measurement point K. A plurality of similar areas are found as a result or comparison using clipped areas only, especially when the measurement target is a subject with repetitive similar patterns. As a result, the user might determine an inappropriate position to be the position corresponding to the position of the measurement point K. In view of this, the clipped display areas are displayed on the reference image 90 and the corresponding image 91, so that the user can recognize the clipped positions of the display images. Thus, the corresponding point can be more easily adjusted to correspond to the measurement point K even in a case where the measurement target is the subject with repetitive similar patterns.

The display unit 11 may display the measurement point peripheral image 94 and the corresponding point peripheral image 95 that are monochrome images. For example, when the reference image 90 and the corresponding image 91 are RGB color images, the display unit 11 may display the measurement point peripheral image 94 and the corresponding point peripheral image 95 of the color images to be monochrome images by using the G channel only, to be free of a color registration error that may occur with the color images. Thus, the user can easily adjust the corresponding point. The display unit 11 may calculate a Y value of the RGB values of the reference image 90 and the corresponding image 91, and may display the measurement point peripheral image 94 and the corresponding point peripheral image 95 as monochrome images using the Y value only. The display unit 11 may display the corresponding image searched by the corresponding point searching unit 8 for the corresponding point, as a corresponding point adjustment image for the user.

The display unit 11 may display the image of the area in the periphery of the measurement point and an image of the area in the periphery of the corresponding point in an overlapped manner, and may display the overlapped images as the corresponding point adjustment image for the user. With this configuration, the user can recognize a state where the corresponding point is displaced from the measurement point by finding doubled edges or the like on the two overlapped images due to the corresponding point failing to correspond to the measurement point. The display unit 11 may display two monochrome images with different colors in an overlapping manner. With this configuration, the user can easily recognize the state where the corresponding point is displaced. For example, the display unit 11 may display an image of an area in the periphery of the measurement point with a color G and an image of an area in the periphery of the corresponding point with a color R. As a result, a position where the corresponding point and the measurement point are appropriately overlapped with each other is colored in yellow (mixture of the colors R and G. At a position where the position of the corresponding point is displaced from the position of the measurement point, the corresponding point has one of components R and G being larger than the other to be displayed as R or a G edge. Thus, the user can more easily recognize the displacement between the measurement point and the corresponding point.

The image processing device 1 according to the present embodiment may be configured to be capable of changing the magnifications of the measurement point peripheral image and the corresponding point peripheral image displayed by the display unit 11 for the adjustment of the corresponding point by the user. When the display unit 11 displays the measurement point peripheral image and the corresponding point peripheral image in the actual scale, the adjustment accuracy of the corresponding point is in a unit of a pixel, and thus the user can perform the adjustment with an accuracy in the unit of a pixel. If the display unit 11 has small pixels, it is difficult for the user to visually recognize the displacement with the accuracy in the unit of a pixel. Thus, the display unit 11 displays the measurement point peripheral image and the corresponding point peripheral image enlarged to be larger than the actual scale, so that the user can easily recognize the displacement between the enlarged images. For example, the display unit 11 may display "ZOOM IN" and "ZOOM OUT" so that the user can increase or reduce the display size by selecting any one of these through a mouse operation or the like. In a case where the display size is increased, the adjustment can be further performed with an accuracy in a unit of a sub pixel smaller than a pixel. The display unit 11 may change the display magnification of the measurement point peripheral image for adjusting the corresponding point and the corresponding point peripheral image in accordance with a parallax value. In the stereoscopic measurement, a longer distance between the two image capturing devices and the measurement point leads to a larger measurement error. Thus, the parallax needs to be accurately calculated to accurately measure the subject far from the two image capturing devices. Thus, in a case where the distance between the two image capturing devices and the measurement point is long, and thus the parallax is small, the display unit 11 displays the measurement point peripheral image for adjusting the corresponding point and the corresponding point peripheral image with a large magnitude. Thus, the user can adjust the corresponding point position in detail by referring to the measurement point peripheral image and the corresponding point peripheral image enlarged, whereby the measurement point can be measured with a higher accuracy. A long distance between the two image capturing devices and the subject results in an image captured with a smaller subject compared with that captured with the distance being short. Thus, the subject at a position far from the image capturing devices are displayed with an increased magnification so that the user can more easily recognize the displacement.

In the present embodiment described above, the image of the area in the periphery of the measurement point in the reference image and the image of the area in the periphery or the corresponding point in the corresponding image are displayed side by side. The user performs the adjustment by referring to the measurement point peripheral image and the corresponding point peripheral image displayed side by side, so that the position of the corresponding point corresponds to the position of the measurement point. With the image of the area in the periphery of the measurement point in the reference image and the image of the area in the periphery of the corresponding point in the corresponding image displayed side by side, the user can adjust the corresponding point, while associating the corresponding image and the reference image with each other. The user refers to the position of the corresponding point accurately adjusted, and thus the measurement point can be measured with a higher accuracy.

Second Embodiment

Next, a second embodiment of the present invention will be described. In the second embodiment, the user that performs stereoscopic measurement by using images captured with three or more image capturing devices adjusts a corresponding point by using a corresponding point adjustment method enabling the position of the corresponding point to be easily and accurately adjusted. Thus, measurement accuracy is improved. In a case where a plurality of corresponding images are captured by a plurality of image capturing devices as in the present embodiment, the image processing method according to the first embodiment may be performed for a combination between the reference image and each of the corresponding images. Thus, the parallaxes of the measurement point in the number that is equal to the number of such combinations are obtained. The accuracy of the three-dimensional coordinates of the measurement point finally obtained can be improved by taking an average or the like of the parallaxes of the measurement point.

An image processing device (not illustrated) according to the present embodiment has the same configuration as the image processing device 1 according to the first embodiment, except that the image capturer 2 includes three or more image capturing devices. Thus, the description on the members already described in the first embodiment will be omitted. The image processing method according to the present embodiment is the same as the one described above except for display modes of the measurement point peripheral image and the corresponding point peripheral image displayed by the display unit 11 in accordance with the steps in the first embodiment. Thus, in the description below, only the display modes of the measurement point peripheral image and the corresponding point peripheral image displayed by the display unit 11 will be described in detail.

Figure 15A:
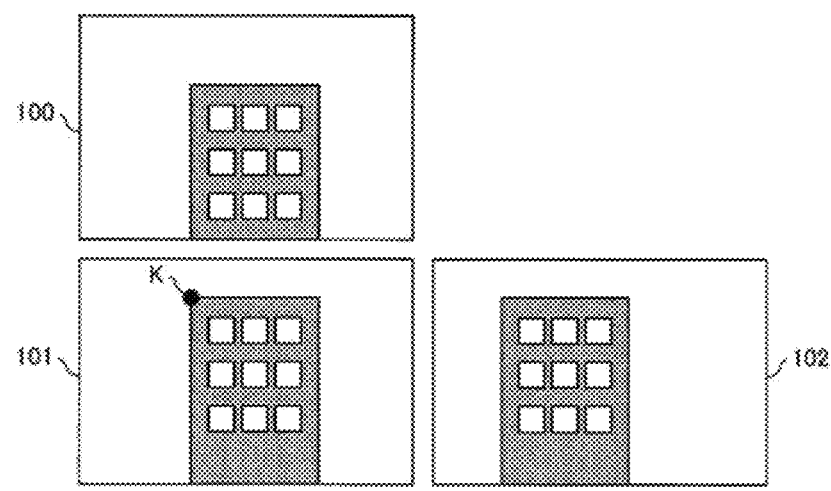
FIG. 15A is a diagram illustrating a reference image and a corresponding image displayed by a display unit.

FIG. 15A illustrates images 100, 101, and 102 captured by three image capturing devices arranged in an L shape along two directions including the horizontal direction (first direction) and a vertical direction (second direction). The image 101 serves as a reference image. The image 102 is a corresponding image captured by the image capturing device arranged next to the image capturing device that has captured the image 101 serving as the reference image, in the horizontal direction. The image 100 is a corresponding image captured by the image capturing device arranged next to the image capturing device that has captured the image 101 serving as the reference image, in the vertical direction. Each of the images includes a subject. The reference image 101 includes the measurement point K set by the user. The stereoscopic measurement may be performed for the measurement point K on the reference image 101, by using the reference image 101 and the image 102 arranged side by side in the horizontal direction on the images, or by using the reference image 101 and the image 100 arranged side by side in the vertical direction on the images. The three-dimensional coordinates of the measurement point as viewed from the image capturing device that has captured the reference image 101 is the same between these cases. Thus, $d_2 - d_1 \times (B_2/B_1) \ldots$ (4) holds true where $B_1$ represents the baseline length between the image capturing devices arranged side by side in the horizontal direction, $B_2$ represents the baseline length between the image capturing devices arranged side by side in the vertical direction, $Z_1$ represents a Z coordinate obtained from the reference image 101 and the corresponding image 102 (a coordinate, in coordinates based on the image capturing device that has captured the reference image 101, in a direction from the image capturing device to the subject), $Z_2$ represents a Z coordinate obtained from the reference image 101 and the corresponding image 100, $d_1$ represents a parallax calculated from the measurement point K on the reference image 101 and the corresponding point on the corresponding image 102, $d_2$ represents a parallax of the measurement point calculated from the measurement point K on the reference image 101 and the corresponding point on the corresponding image 100, and the three-dimensional coordinates of the measurement point calculated are the same so that $Z_1 = Z_2$ holds true. With the relationship between $d_1$ and $d_2$ in Formula (4) satisfied, the corresponding points on the two corresponding images may be adjusted in the stereoscopic measurement using images captured with three image capturing devices. In such a case, the corresponding points on one corresponding image 102 and the other corresponding image 100 may be simultaneously adjusted in an interlocking manner, so that the corresponding points correspond to the measurement point K on the reference image 101. When the corresponding point on the one corresponding image 102 is adjusted to be at a position where a parallax d1 is obtained relative to the measurement point K on the reference image 101, the parallax $d_2$ between the measurement K on the reference image 101 and the corresponding point on the other corresponding image 100 may be adjusted to be a value in Formula (4), so that the corresponding points on the two corresponding images can be simultaneously adjusted. With this configuration, the load on the user can be reduced compared with a configuration where the user independently performs each of the adjustment of the corresponding point with reference to the reference image 101 and the one corresponding image 102 and the adjustment of the corresponding point with reference to the reference image 101 and the other corresponding image 102. With the corresponding points simultaneously adjusted, the corresponding points that are difficult to adjust with reference to the one corresponding image 102 can be adjusted with reference to the other corresponding image 100 with which the adjustment can be easily performed. Thus, the user can accurately adjust the corresponding point.

Figure 15B:
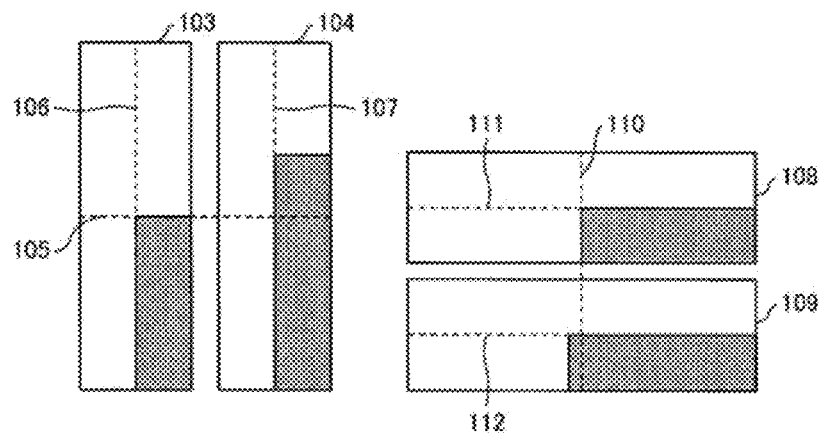
FIG. 15B is a diagram illustrating a measurement point peripheral image and a corresponding point peripheral image displayed by a display unit.

FIG. 15B illustrates a measurement point peripheral image and a corresponding point peripheral image for adjusting a corresponding point corresponding to the measurement point K. An image 103 and an image 104 are respectively an image of an area in the periphery of the measurement point K on the reference image 101 and an image of an area in the periphery of the corresponding point on the corresponding image 100. An image 108 and an image 109 are respectively an image of an area in the periphery of the measurement point K on the reference image 101 and an image of an area in the periphery of the corresponding point on the corresponding image 102, The display unit 11 displays the image 103 and the image 104 side by side and displays the image 108 and the image 109 side by side so that the user can easily adjust the corresponding points. Specifically, the display unit 11 displays a guide (horizontal guide 105) passing through the measurement point K and the corresponding point and two guides (vertical guides 106 and 107) that are orthogonal to the horizontal guide 105 in an overlapping manner in the image 103 and the image 104 displayed side by side. The vertical guides 106 and 107 respectively pass through the measurement point K and the corresponding point in the images. Specifically, the display unit 11 displays a guide (vertical guide 110) passing through the measurement point K and the corresponding point and two guides (horizontal guides 111 and 112) that are orthogonal to the vertical guide 110 in an overlapping manner in the image 108 and the image 109 displayed side by side. The horizontal guides 111 and 112 respectively pass through the measurement point K and the corresponding point in the images.

The image 103 that is a measurement point peripheral image of the reference image 101 and the image 104 that is a corresponding point peripheral image of the corresponding image 100 involve a parallax in the vertical direction on the image 103 and the image 104. Thus, the user adjusts the corresponding point in the vertical direction on the image 104. The image 108 that is a measurement point peripheral image of the reference image and the image 109 that is a corresponding point peripheral image of the corresponding image 102 involve a parallax in the vertical direction on the image 108 and the image 109. Thus, the user adjusts the corresponding point in the vertical direction on the image 109.

Next, a display mode of a measurement point periphery image and a corresponding point periphery image displayed by the display unit 11 according to another aspect of the image processing method of the present embodiment is described.

Figure 16:
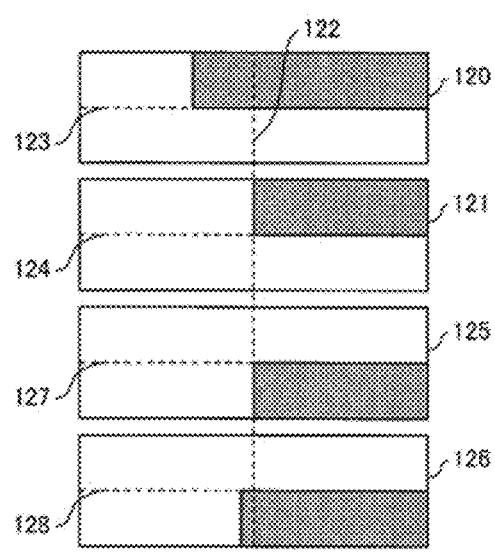
FIG. 16 is a diagram illustrating a measurement point peripheral image and a corresponding point peripheral image displayed by a display unit.

FIG. 16 illustrates a measurement point peripheral image and a corresponding point peripheral image in a case where stereoscopic measurement is performed with images captured by three image capturing devices arranged to be in an L shape. An image 121 is an image (measurement point peripheral image 121) illustrating an area in the periphery of the measurement point K on the reference image 101, and an image 120 is an image (corresponding point peripheral image 120) illustrating an area in the periphery of the corresponding point on the corresponding image 100. The measurement point peripheral image 121 and the corresponding point peripheral image 120 are arranged side by side in the vertical direction on the images. Similarly, an image 125 is an image (measurement point peripheral image 125) illustrating an area in the periphery of the measurement point K on the reference image 101, and an image 126 is an image (corresponding point peripheral image 126) illustrating an area in the periphery of the corresponding point on the corresponding image 102. The measurement point peripheral image 125 and the corresponding point peripheral image 126 are arranged side by side in the vertical direction on the images. The display unit 11 displays a guide (vertical guide 122) passing through the measurement point K and the corresponding point and two guides (horizontal guides 123 and 124) that are orthogonal to the vertical guide 122 in an overlapping manner in the images 120 and 121 displayed side by side. The horizontal guides 123 and 124 respectively pass through the measurement point K and the corresponding point in the images. The display unit 11 displays a guide (vertical guide 122 described above) passing through the measurement point K and the corresponding point and two guides (horizontal guides 127 and 128) that are orthogonal to the vertical guide 122 in an overlapping manner in the images 125 and 126 displayed side by side. The horizontal guides 127 and 128 respectively pass through the measurement point K and the corresponding point in the images.

The images 121, 120, 125, and 126 respectively correspond to the images 103, 104, 108, and 109 in FIG. 15B, and the images 121 and 120 are obtained by rotating the respective images 103 and 104 by 90 degrees. The images 121 and 120 as a result of rotating the images arranged side by side in the vertical direction on the images by 90 degrees are arranged side by side in the horizontal direction on the images to be arranged in manner similar to that of the images 103 and 104 in FIG. 15B. Thus, the corresponding point can be adjusted in a manner similar to that in the adjustment of the corresponding point in the measurement point periphery image and the corresponding point periphery image in FIG. 15B.

When the corresponding point adjusting unit 9 adjusts the corresponding point based on an input from the user through a mouse operation or four-way controller input, a more natural operation can be achieved with a direction or the operation matching the direction of the movement of the corresponding point on, the image. An adjustment direction may be set to be the same for the corresponding points on the images 120 and 126, which are respectively parts of the corresponding image 100 and the corresponding image 102, and the corresponding points on the images 120 and 126 may be interlocked as described above. With this configuration, the user can check the position of the one of the corresponding points interlocked in a single direction while adjusting the other one of the corresponding points. Thus, the corresponding points can be more accurately adjusted.

An image may be rotated by 90 degrees to be displayed with the epipolar hue direction of the image rotated by 90 degrees. Thus, arrangement directions of a measurement point peripheral image for adjusting a corresponding point and a corresponding point peripheral image by 90 degrees. FIG. 16 illustrates the measurement point peripheral image 121 and the corresponding point peripheral image 120 as a result of rotating images arranged side by side in the horizontal direction of the images so that the images are arranged side by side in the vertical direction of the display unit 11. As a result, the side by side arrangement in a direction orthogonal to the epipolar line direction can be maintained. The user can adjust the corresponding points on images captured by four or more image capturing devices in a similar manner. Specifically, the corresponding point adjusting unit 9 may adjust the positions of the corresponding points OD the corresponding images in an interlocking manner so that the positions of the corresponding points correspond to that of the measurement point on the reference image. Thus, the user can easily adjust the corresponding points. The measurement point peripheral image and the corresponding point peripheral image for adjusting a corresponding point may be rotated so that the direction of the adjustment by the user becomes the same between the corresponding images. Thus, the user can even more easily adjust the corresponding points.

Third Embodiment (Embodiment Implemented by Software)

Functional blocks or the image processing device 1 described above may be implemented with a computer. This configuration may be realized by recording a program (image processing program) for realizing the image processing device 1 on a computer-readable recording medium and causing a computer system to read the program recorded on the recording medium for execution. The "computer-readable recording medium" refers to a portable medium such as a flexible disk, a magneto-optical disk, a ROM, and a CD-ROM, and a storage device such as a hard disk built into the computer system. Moreover, the "computer-readable recording medullar" may include a medium that dynamically retains the program for a short period of time, such as a communication line that is used to transmit the program over a network such as the Internet or, over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Additionally, the image processing method according to the embodiments described above may be partially or completely realized as a Large Scale Integration (LSI) circuit, which is a typical integrated circuit. The functional blocks for the stereoscopic measurement may be individually realized as chips, or may be partially or completely integrated into a chip. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology.

The embodiment of the present invention has been described in detail above referring, to the drawings, but the specific configuration is not limited to the above embodiments and various amendments can be made to a design that fall within the scope that does not depart from the gist of the present invention.

Supplement

An image processing device (1) according to Aspect 1 of the present invention is an image processing device that calculates three-dimensional coordinates of a measurement point on a subject based on a reference image of the subject captured by a first image capturing device and a corresponding image of the subject captured by a second image capturing device, and includes a corresponding point searching unit (8) that searches the corresponding image for a corresponding point corresponding to the measurement point on the reference image, and a display unit (11) that displays a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side, to adjust a position of the corresponding point found by the corresponding point searching unit.

With the configuration described above, the image of the area in the periphery of the measurement point in the reference image and the image of the area in the periphery of the corresponding point in the corresponding image are displayed side by side. The user performs the adjustment by referring to the measurement point peripheral image and the corresponding point peripheral image displayed side by side, so that the position of the corresponding point corresponds to the position of the measurement point. With the image of the area in the periphery of the measurement point in the reference image and the image of the area in the periphery of the corresponding point in the corresponding image displayed side by side, the user can adjust the corresponding point while associating the corresponding image and the reference image with each other. The user refers to the position of the corresponding point accurately adjusted, and thus the measurement point can be measured with a higher accuracy.

With the image processing device (1) according to Aspect 2 of the present invention, in Aspect 1 described above, the measurement point peripheral image and the corresponding point peripheral image are displayed side by side in a direction orthogonal to an epipolar line of the reference image and the corresponding image.

With the configuration described above, the user can easily check the displacement in the images in a direction of the epipolar line, and thus the corresponding point can be more accurately adjusted.

With the image processing device (1) according to Aspect 3 of the present invention, in Aspect 1 or 2 described above, the corresponding point peripheral image is formed in a rectangular shape having long sides extending along an epipolar line of the reference image and the corresponding image and short sides extending along a direction orthogonal to the epipolar line.

With the configuration described above, the user can more easily adjust the corresponding point along the epipolar line.

With the image processing device (1) according to Aspect 4 of the present invention, in any one of Aspects 1 to 3 described above, the display unit (11) displays a guide for adjusting the position of the corresponding point to be overlapped with the measurement point peripheral image and the corresponding point peripheral image.

With the configuration described above, the user can adjust the corresponding point while checking the guide, whereby the corresponding point can be more accurately adjusted.

The image processing device (1) according to Aspect 5 of the present invention, in any one of Aspects 1 to 4 described above, further includes an input unit (4) to which an instruction related to movement of the corresponding point is input, and a corresponding point adjusting unit (9) that adjusts the position of the corresponding point based on the instruction input to the input unit. The corresponding point adjusting unit adjusts the position of the corresponding point only in a direction along an epipolar line of the reference image and the corresponding image.

With the configuration described above, the adjustable direction by the user is limited so that the corresponding point can be prevented from being inappropriately adjusted to be outside the epipolar line.

The image processing device (1) according to Aspect 6 of the present invention, in Aspect 5 described above, calculates the three-dimensional coordinates based on another corresponding image of the subject captured by a third image capturing device, the reference image, and the corresponding image.

the corresponding point searching unit (8) searches the other corresponding image for another corresponding point corresponding to the measurement point, and the corresponding point adjusting unit (9) adjusts a position of the other corresponding point in association with the adjustment for the position of the corresponding point.

With the configuration described above, the corresponding point on one corresponding image adjusted by the user is interlocked with one or more corresponding point on another corresponding image. Thus, the user can simultaneously adjust a plurality of corresponding points. With this configuration, the load on the user can be reduced compared with a configuration where the user independently performs the adjustment with reference to the reference image and the corresponding image for a number of times that is the same as the number of possible combinations between the reference images and corresponding images. With the corresponding points simultaneously adjusted, the corresponding points that are difficult to adjust with reference to the one corresponding image can be adjusted with reference to the other corresponding image with which the adjustment can be easily performed. Thus, the user can accurately adjust the corresponding point.

With the image processing device (1) according to Aspect 7 of the present invention, in Aspect 6 described above, the first and the second image capturing devices are arranged along a first direction, the first and the third image capturing devices are arranged along a second direction intersecting with the first direction, another corresponding point peripheral image that is an image of an area in a periphery of the other corresponding point extracted from the other corresponding image, the measurement point peripheral image, and the corresponding point peripheral image are displayed with an adjustment direction of the position of the other corresponding point in the other corresponding point peripheral image being same as an adjustment direction of the position of the corresponding point in the corresponding point peripheral image.

With the configuration described above, the user can check the position of one of the corresponding points interlocked in the same direction, when adjusting the other one of the corresponding points. Thus, the corresponding point can be adjusted more accurately.

An image processing method according to Aspect 8 of the present invention is an image processing method for calculating three-dimensional coordinates of a measurement point on a subject based on a reference image of the subject captured by a first image capturing device and a corresponding image of the subject captured by a second image capturing device, and includes searching the corresponding image for a corresponding point corresponding to the measurement point on the reference image, and displaying a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side, to adjust a position of the corresponding point found in the searching.

With the configuration described above, an effect is exerted similarly to the image processing device according to Aspect 1 described above.

The present invention is not limited to each of the above-described embodiments. It is possible to make various modifications within the scope of the claims. An embodiment obtained by appropriately combining technical elements each disclosed in different embodiments falls also within the technical scope of the present invention. Further, when technical elements disclosed in the respective embodiments are combined, it is possible to form a new technical feature.

CROSS-REFERENCE OF RELATED APPLICATION

This application claims the benefit of priority to JP 2016-107767 filed on May 30, 2016, which is incorporated herein by reference in its entirety.

REFERENCE SIGNS LIST

1 image processing device
2 Image capturer
3 Storage
4 Input unit
5 Measurer (calculating unit)
6 Image receiver
7 Measurement point receiver
8 Corresponding point searching unit.
9 Corresponding point adjusting unit
10 Measurement value calculating unit
11 Display unit
12 First image capturing device
13 Second image capturing device
14, 16 Image sensor
15, 17 Lens

The invention claimed is:

1. An image processing device comprising one or more processors configured to cause the device to function as:
a corresponding point searching circuitry configured to search a corresponding image for a corresponding point corresponding to a measurement point on a reference image obtained by capturing an image of a subject, the corresponding image being obtained by capturing an image of the subject from a point of view different from a point of view for the reference image;
a corresponding point adjusting circuitry that causes a display device to display a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side in a direction orthogonal to an epipolar line of the reference image and the corresponding image, and is configured to adjust a position of the corresponding point based on an instruction input to an input device; and
a calculating circuitry configured to calculate three-dimensional coordinates of the measurement point on the subject based on a position of the measurement point on the reference image and the position of the corresponding point on the corresponding image.

2. The image processing device according to claim 1, wherein the corresponding point peripheral image is formed in a rectangular shape having long sides extending along an epipolar line of the reference image and the corresponding image and short sides extending along a direction orthogonal to the epipolar line.

3. The image processing device according to claim 1, wherein the corresponding point adjusting circuitry causes the display device to display the measurement point to be overlapped with the measurement point peripheral image and to display a corresponding point found by the corresponding point searching circuitry to be overlapped with the corresponding point peripheral image.

4. The image processing device according to claim 1, wherein the corresponding point adjusting circuitry causes the display device to display a guide for adjusting the position of the corresponding point to be overlapped with the measurement point peripheral image and the corresponding point peripheral image.

5. The image processing device according to claim 1, wherein the corresponding point adjusting circuitry adjusts the position of the corresponding point only in a direction along an epipolar line of the reference image and the corresponding image.

6. The image processing device according to claim 4 further comprising:
a first image capturing device configured to generate the reference image; and
a second image capturing device configured to generate the corresponding image, wherein the image processing device calculates the three-dimensional coordinates based on another corresponding image of the subject captured by a third image capturing device, the reference image, and the corresponding image,
the corresponding point searching circuitry searches the other corresponding image for another corresponding point corresponding to the measurement point, and
the corresponding point adjusting circuitry adjusts a position of the other corresponding point in association with an adjustment for the position of the corresponding point.

7. The image processing device according to claim 6, wherein
the first and the second image capturing devices are arranged along a first direction,
the first and the third image capturing devices are arranged along a second direction intersecting with the first direction, and
another corresponding point peripheral image that is an image of an area in a periphery of the other corresponding point extracted from the other corresponding image, the measurement point peripheral image, and the corresponding point peripheral image are displayed with an adjustment direction of the position of the other corresponding point in the other corresponding point peripheral image being the same as an adjustment direction of the position of the corresponding point in the corresponding point peripheral image.

8. The image processing device according to claim 1 further comprising the display device.

9. An image processing method comprising:
searching a corresponding image for a corresponding point corresponding to a measurement point on a reference image obtained by capturing an image of a subject, the corresponding image being obtained by capturing an image of the subject from a point of view different from a point of view for the reference image;
causing a display unit to display a measurement point peripheral image that is an image of an area in a periphery of the measurement point extracted from the reference image and a corresponding point peripheral image that is an image of an area in a periphery of the corresponding point extracted from the corresponding image, the measurement point peripheral image and the corresponding point peripheral image being displayed side by side in a direction orthogonal to an epipolar line of the reference image and the corresponding image, and adjusting a position of the corresponding point based on an instruction input to an input unit; and
calculating three-dimensional coordinates of the measurement point on the subject based on a position of the measurement point on the reference image and the position of the corresponding point on the corresponding image.

10. A non-transitory recording medium storing an image processing program causing-computer to function as the image processing device according to claim 1,
wherein the image processing program causes the computer to function as the corresponding point searching circuitry, the corresponding point adjusting circuitry, and the calculating circuitry.

11. The image processing device according to claim 4, wherein the guide passes through the measurement point in the measurement point peripheral image and the corresponding point in the corresponding point peripheral image.

* * * * *